A. C. TERRELL.
TIRE.
APPLICATION FILED APR. 13, 1920.

1,368,304.

Patented Feb. 15, 1921.

WITNESS:
Fred C. Fischer

INVENTOR:
Alva C. Terrell,
BY
F. G. Fischer
ATTORNEY.

UNITED STATES PATENT OFFICE.

ALVA C. TERRELL, OF KANSAS CITY, MISSOURI.

TIRE.

1,368,304.   Specification of Letters Patent.   Patented Feb. 15, 1921.

Application filed April 13, 1920. Serial No. 373,660.

*To all whom it may concern:*

Be it known that I, ALVA C. TERRELL, a citizen of the United States, residing at Kansas City, in the county of Jackson and State of Missouri, have invented certain new and useful Improvements in Tires, of which the following is a specification.

My invention relates to pneumatic tires and among other features embodies a novel combination of fabric and cord layers whereby all the strength of the ordinary fabric tire is had with the added resistance of the cords to blow-outs.

As is well known, cord construction has a greater resistance to blowouts than ordinary woven fabric, but is more susceptible to puncture by sharp objects, which on penetrating the tread of the tire, readily pass between the cords and puncture the inner tube. By incorporating both the woven fabric and the cord constructions in the same tire, the advantages of each construction is had and a very desirable tire is produced.

Another feature resides in interposing cushioning means between the fabric basis and the more pliable cords to allow limited independent play and prevent the separation and buckling which might occur if said cords were applied directly to the fabric.

In order that the invention may be fully understood, reference will now be had to the accompanying drawing, in which.

Figures 1, 2:
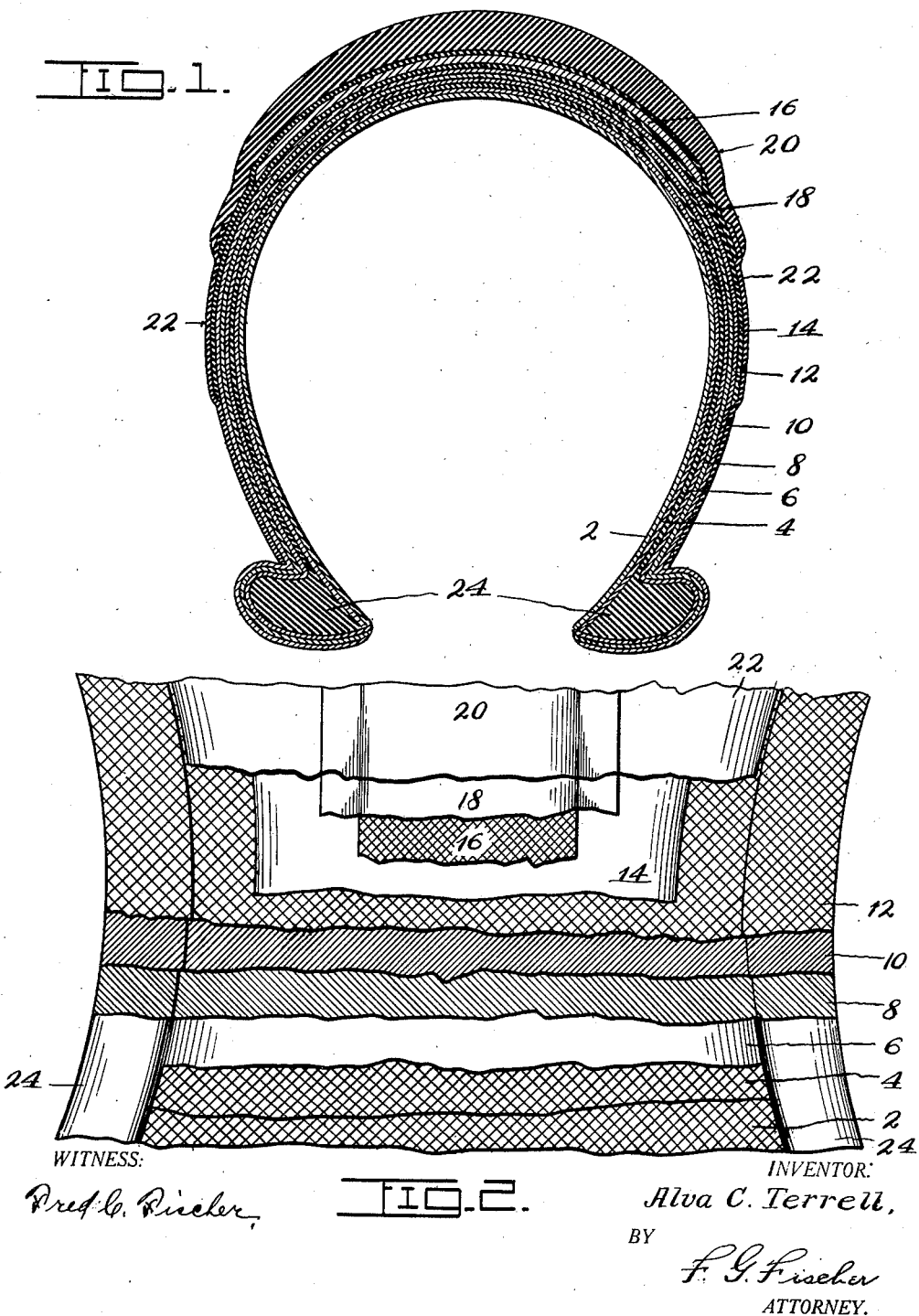
Figure 1 is a cross sectional view of a tire constructed in accordance with the invention.
Fig. 2 is a plan view of a fragment of the tire with the upper layers broken away to show the underlying layers.

In carrying out the invention, I employ two layers of woven fabric 2 and 4, as the foundation of the tire. Upon the outermost layer of fabric 4 is placed a rubber cushion 6 and on top of said cushion 6 is placed a layer of cords 8, which extend at an angle in one direction as disclosed on Fig. 2. On top of the layer of cords 8 is placed another layer of cords 10, which extend at an angle to said cords 8. The outer layer of cords 10 is covered by a layer of closely woven fabric 12 upon which a rubber cushion 14 is placed. The cushion 14 is surmounted by a breaker strip 16 on top of which a cushion 18 is placed. On top of the cushion 18 is placed the tread 20 the sides of which are flanked with strips 22.

By arranging the cords 10 at an angle to the cords 8 the layers formed by said cords are not so readily punctured and at the same time greater resiliency is had than with the ordinary fabric layers. As shown on the drawing, the cords 8 and 10 come entirely over the beads 24 of the tire and are protected by the strips 22 from rim bruises and rim cuts. By laying the cords 8 and 10 over the inner plies of fabric 2 and 4, said cords act as a breaker to road shocks and stone bruises and protect said inner plies of fabric from coming into contact with rough objects in the road likely to separate the weave of the fabric. The cords 8 and 10 in turn are protected by layers of fabric which are tougher and more resistant to punctures and glass cuts than the cords.

As shown on Fig. 2, the cushion 6 is no mere skin coat but is a heavy ply of rubber which completely covers the outer ply 4 of fabric and thus permits the cords 8 to move with greater freedom than the less pliable fabric, whereas if the cords were applied directly to the fabric the difference in play would tend to cause the plies to separate and buckle.

The number of layers of fabric may be increased or diminished according to the size of the tire without departing from the principle of the invention.

By incorporating the cords and woven fabric as above pointed out, it is apparent that I have produced a tire in which blowouts and puncture trouble is reduced to a minimum and greater resiliency is had than where woven fabric alone is employed.

Having thus described my invention, what I claim and desire to secure by Letters Patent, is:

1. In a pneumatic tire, a basis of woven fabric, cushioning means superimposed on said basis, and cords superimposed on said cushioning means which latter permits limited independent movement between the fabric basis and said cords.

2. In a pneumatic tire, a basis of woven fabric, cushioning means superimposed on said basis, a layer of cords superimposed on said cushioning means and having the individual cords extending obliquely thereto, and another layer of cords superimposed on the first layer of cords and having the individual cords extending obliquely to the same.

3. In a pneumatic tire, the combination with a plurality of layers of rubber, fabric, and the like, of a basis of woven fabric, a ply of cords having the individual cords extending obliquely to the circumference of the tire, a layer of rubber interposed between the fabric basis and said ply of cords to allow of limited independent movement, and another ply of cords superimposed on the first ply of cords and having the individual cords extending obliquely to the same.

In testimony whereof I affix my signature, in the presence of two witnesses.

ALVA C. TERRELL.

Witnesses:
 THOS. R. TADLOCK,
 L. J. FISCHER.